Fig. 3.

March 28, 1939.　　　W. HARPER, JR　　　2,151,698
INTERNAL COMBUSTION ENGINE
Filed March 27, 1936　　　5 Sheets-Sheet 5

INVENTOR
WILLIAM HARPER, JR.
BY
ATTORNEY

Patented Mar. 28, 1939

2,151,698

UNITED STATES PATENT OFFICE 2,151,698

INTERNAL COMBUSTION ENGINE

William Harper, Jr., Port Washington, N. Y.

Application March 27, 1936, Serial No. 71,117

20 Claims. (Cl. 123—65)

This invention relates to internal combustion engines and aims to provide a heavy oil engine whose ratio of weight to power is sufficiently low to make it available for airplane use. Other objects of the invention will be mentioned later.

It has long been recognized that the necessity for carrying large quantities of gasoline is a serious hazard in aviation; but the heavy-oil-burning engines heretofore made have had too high a weight-to-power ratio to permit their use on airplanes. The difficulty in producing and igniting a mixture of heavy oil and air has led to the almost exclusive use, in internal combustion engines using such fuel, of engines of the Diesel type in which the fuel is sprayed into air which has been heated by compression above the ignition point of the fuel. The heavy compression required necessitates the use of heavy parts, and this form of ignition cannot be timed with sufficient accuracy to make it satisfactory in multiple cylinder engines.

The engine which I have invented avoids these difficulties by providing a new method of forming and igniting a mixture of heavy oil and air. The oil is sprayed axially into a whirling body of air, so that it gradually picks up the motion of the air and forms a combustible mixture of air and oil within an envelope of air which protects the cylinder and the piston from excessive heat. The whirling body of mixture is ignited by a jet of flame entering it at right angles to its axis, arresting its whirling motion and at the same time causing instantaneous combustion. The jet of flame is produced by spark plug ignition of a mixture of air and a light, high-octane fuel in a separate chamber connected with the cylinder of the engine. By avoiding ignition by compression, this method permits a light construction, and, by permitting the use of spark plugs, the engine permits a multiple cylinder design which makes the engine flat enough to fit within the wing of an airplane without interfering with its aerofoil surfaces. I have thus produced a heavy-oil-burning engine whose lightness and compactness adapt it for airplane use.

Besides providing means for carrying out the method which has been described, my invention involves a number of subsidiary features, several of which may advantageously be used in other types of engines.

The nature of my invention may best be understood from a detailed description of the construction and operation of a practical, heavy-oil-burning, internal combustion engine embodying the invention and illustrated in the accompanying drawings. The drawings show, for the sake of illustration, an eight-cylinder engine of the opposed cylinder, two-cycle type, embodying the invention:

The engine illustrated has four pairs of opposed cylinders 10. The inner ends of each pair of cylinders 10 open into a crankcase 11 which connects the cylinders. The cylinders are provided with water jackets 12 whose efficiency is increased by the spiral baffles 13 contained in them. With each pair of cylinders and its crank case are associated (A) means for supplying air to the crankcase, (B) means for by-passing air around the pistons from the crankcase to the cylinders, (C) a main fuel supply, (D) means for firing the fuel and air mixture, (E) means for utilizing a part of the exhaust fuel to increase the pressure of the air in the crankcase, and (F) means for exhausting the main body of burnt gases from the cylinders.

The means for supplying air to each crankcase 11 includes a blower A1, which may be directly connected to the main shaft of the engine and which forces air under a pressure of approximately three pounds per square inch through an inlet manifold A2 to an inlet valve A3 which controls the admission of air to the crankcase.

Figure 3:
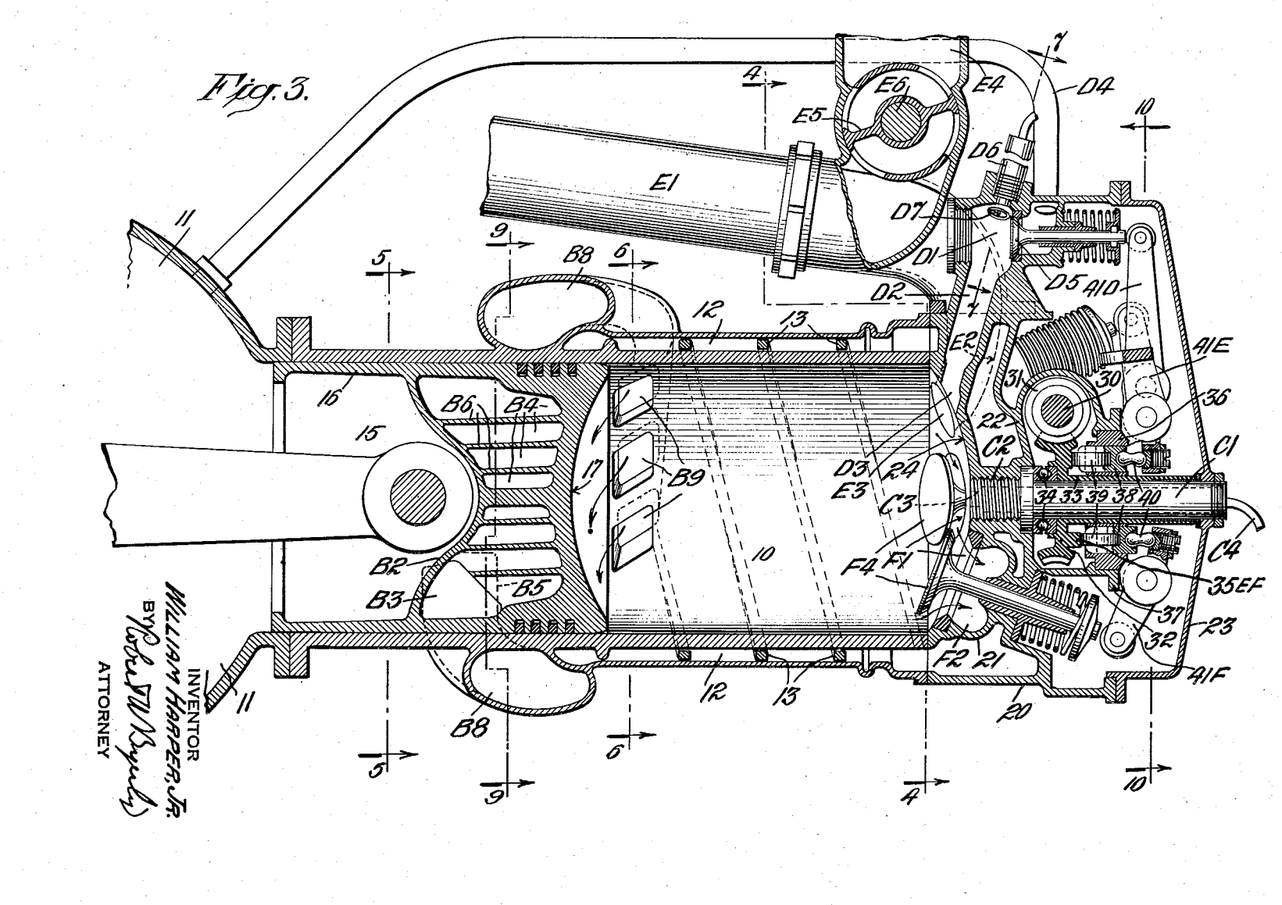
Fig. 3 is an enlarged section of one of the cylinders taken on the same plane as Fig. 2.
Figures 4, 5, 6, 7, 8:
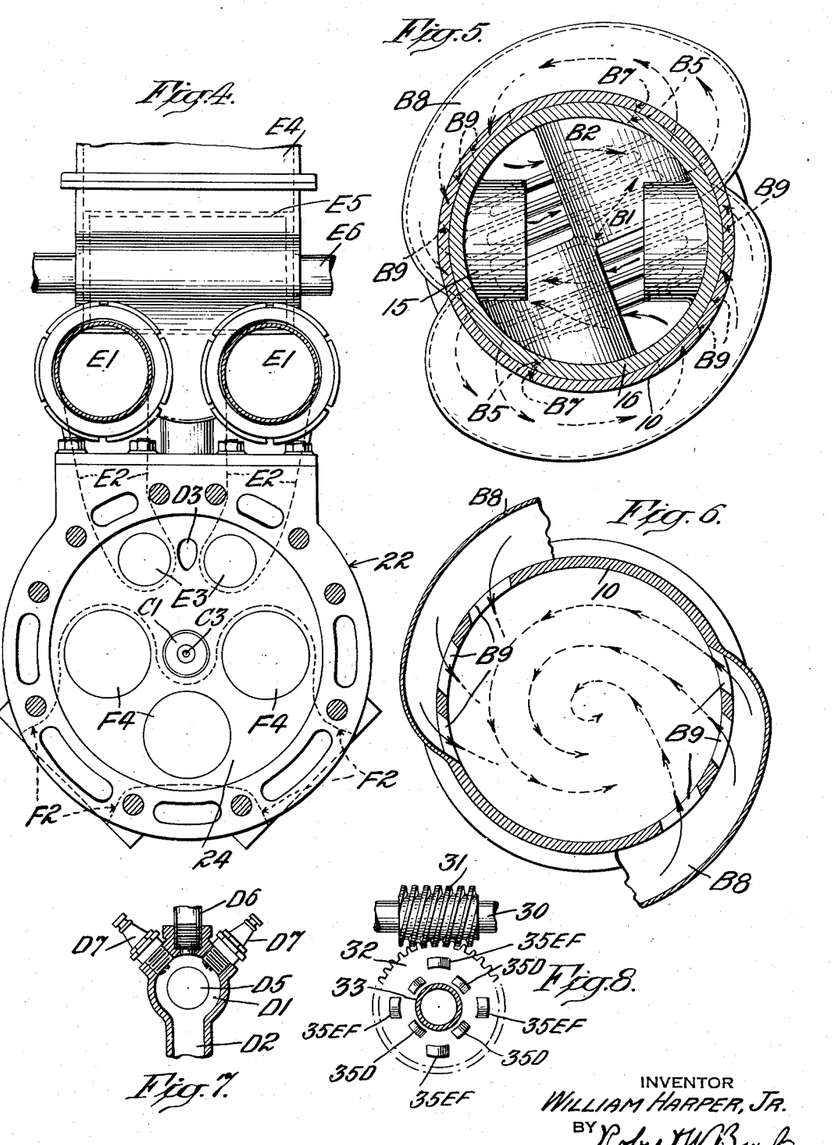
Fig. 4 is a section on the line 4—4 of Fig. 3 showing the inner surface of the cylinder head and parts connected with the cylinder head.
Fig. 5 is a section on the line 5—5 of Fig. 3 showing the cylinder and the piston and omitting the wrist pin and connecting rod.
Fig. 6 is a section on the line 6—6 of Fig. 3 showing the air inlet ports on the cylinder.
Fig. 7 is a section on the line 7—7 of Fig. 3 showing the primary combustion chamber.
Fig. 8 is a fragmentary view showing the valve cam and the means for rotating it.
Figures 9, 10, 11:
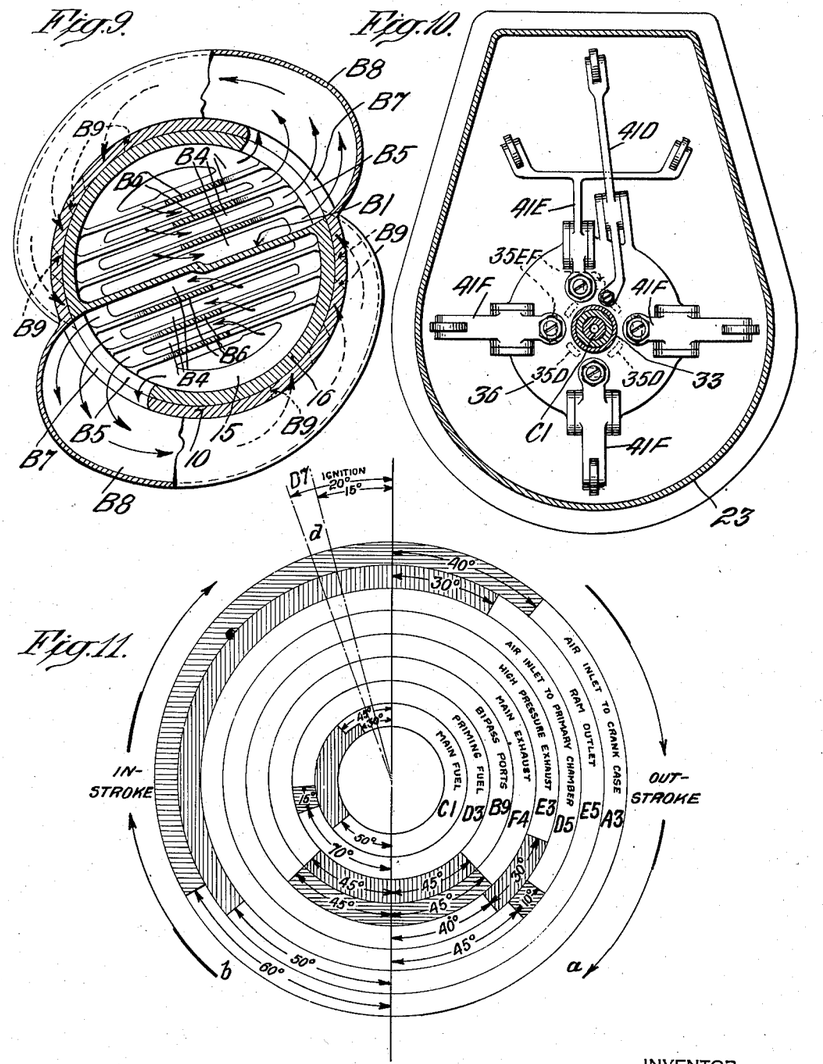
Fig. 9 is a section on the line 9—9 of Fig. 3 showing the piston and the air outlet ports in the cylinder.
Fig. 10 is a section on the line 10—10 of Fig. 3 showing the valve operating mechanism.
Fig. 11 is a timing diagram of the engine.

The means for by-passing air from the crank case to the cylinders are of a peculiar construction which results in introducing a heated whirling body of air into the cylinders. As best seen in Figs. 3, 5 and 9, each piston 15 is provided with a skirt 16 within which is a diametrical partition B1 and a transverse partition B2 containing two apertures B3 which form the entrance of two passages B4 leading from the rear end of the piston to ports B5 in the skirt 16 of the piston. Fins B6 in the passages B4 provide for transferring heat from the piston to the air passing through these passages. When the piston is at the inner end of its stroke, the ports B5 in the skirt of the piston register with ports B7 in the cylinder wall, which are connected by external conduits B8 to two diametrically opposite sets of three air entrance ports B9 in the wall of the cylinder. The conduits B8 extend spirally around the outer wall of the cylinder and are of gradually decreasing cross-section so as to accelerate the velocity of the air passing through them. The entrance ports B9 pass through the cylinder wall obliquely, the three ports of each set being tangential to different circles concentric with the cylinder, so as to permit the air from the conduits B8 to continue the spiral motion which it has been given in the conduits and enter the cylinder in helically advancing streams (see Fig. 6). The entrance ports B9 are positioned so that they are uncovered by the front end of the piston 15 when the piston is at the inner end of its stroke. The front end of the piston has a concave surface 17, the purpose of which is hereinafter explained.

The fuel supply means, the firing means and valve mechanism for each cylinder is located in a casing 20 at the head of the cylinder. This casing consists of a casting 21 which may be made integral with the cylinder head 22 as shown, and a cover 23 closing the outer end of the casting 21. The inner surface 24 of the cylinder head 22 is concave like the front surface 17 of the piston.

The main fuel supply means includes an injector C1 located in the casing 20, with its inner end secured in a central opening C2 in the cylinder head 22, so that its nozzle C3 is directed axially into the cylinder. The injector C1 is of the conventional type used for the injection of heavy fuels into the cylinders of Diesel engines and is, therefore, not described in detail. Fuel is supplied to it through a pipe C4 from a pump not shown, which is driven from the main shaft of the engine and timed by the means customarily used with such fuel injectors in Diesel engines.

The firing means includes a primary combustion chamber D1 formed in the casting 21 outside the cylinder, and a nozzle D2 extending from the primary combustion chamber D1 and entering the cylinder head at D3. The nozzle D2 extends in a diametric plane of the cylinder on a line which crosses the axis of the cylinder nearly at right angles. Air is supplied to the primary combustion chamber D1 from the crank case 11 through a conduit D4 controlled by an inlet valve D5 located in the casing 20. A light fuel is supplied to the primary combustion chamber D1 through an injector D6 of conventional construction to which the fuel is supplied by a conventional pump and timing device. Spark plugs D7, preferably two in number (Fig. 7), are provided to ignite the mixture in the primary combustion chamber D1. Conventional means for supplying electricity and timing the spark are connected with these spark plugs.

Figure 1:
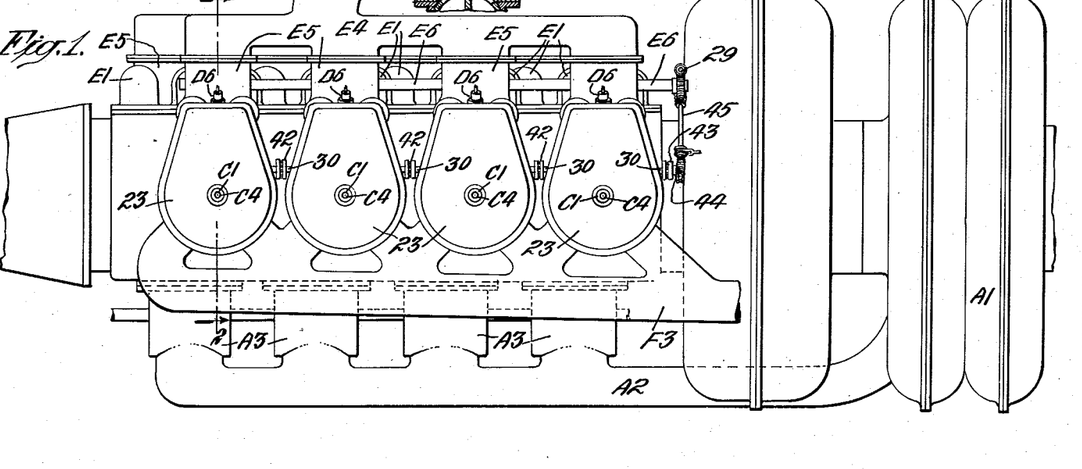
Fig. 1 is a side elevation of the engine.
Figure 2:
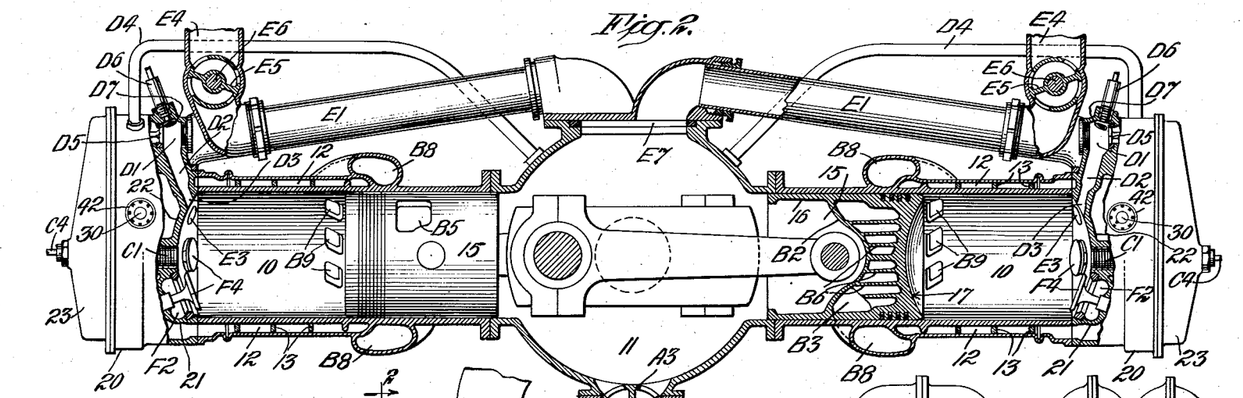
Fig. 2 is a vertical section on the axis of one of the pairs of opposed cylinders, taken on the line 2—2 of Fig. 1.

The means for utilizing a part of the exhaust for increasing the pressure in the crankcase includes ram conduits E1 connecting the crankcase 11 with two small high-pressure exhaust ports E2 in the cylinder head (Figs. 1, 3 and 4). The ports E2 are controlled by valves E3. Exhaust or scavenging ports E4 are provided in the ram conduits E1 near the ends of these conduits which enter the cylinder head, and are controlled by valves E5 operated by a shaft E6 (Figs. 1 and 2) driven from the engine shaft. A manually operated grid valve E7 is provided at the ends of the conduits E1 which enter the crankcase.

The main exhaust from the cylinder is through three large ports F1 in the cylinder head connected through passages F2 in the casting 21 with the exhaust manifold F3. The ports F1 are controlled by the main exhaust valves F4.

Valve control mechanism for operating the main exhaust valves F4, the high-pressure exhaust valves E3 and the inlet valve D5 of the primary combustion chamber D1 is contained in the casing 20, and driven by a shaft 30 extending across the casing and journalled in its side walls. The shaft 30 carries a worm 31, which meshes with a combined gear and cam member 32 (Figs. 3 and 8) journalled on a sleeve 33 surrounding the fuel injector C1 and supported on thrust bearings 34. The gearing is such that the cam member 32 is rotated at one-quarter the speed of rotation of the engine shaft. On the upper surface of the cam member 32 are two concentric series of cams spaced 90° apart. The cams 35EF of the outer series control the high-pressure exhaust valves E3 and the main exhaust valves F4; and the cams 35D of the inner series control the inlet valve D5.

A fulcrum-bearing disc 36, with a central opening surrounds the sleeve 33 and the injector C1, is secured in an opening at the top of an inner wall 37 in the casting 21. This disc contains vertical bores in which are mounted plungers 38, each of which bears a roller 39 in position to be engaged by one set of the cams. The plungers are connected by knuckles 40 (two of which are shown in Fig. 3) with the inner ends of levers 41D, 41E and 41F, 41F, 41F, whose outer ends engage the stems of the inlet valve D5, the high-pressure exhaust valves E3 and the three exhaust valves F4 respectively. As shown in Fig. 10, the inner ends of the three levers 41F and the plungers operating these levers are spaced by angles of 90°, while the inner end of the lever 41E is offset from a 90° position with respect to the levers 41F, so that the equally spaced outer series of cams 35EF may operate the high-pressure exhaust valves E3 in advance of the operation of the main exhaust valves F4.

The transverse shaft 30 of the valve mechanism of each cylinder terminates a short distance outside the walls of the cylinder-head casing 20 of that cylinder. The shafts 30 of the cylinders are joined by removable couplings 42, and one end of the shaft 30 of one of the end cylinders is connected by a similar coupling 43 to a shaft 44 driven through a cross-shaft 45 from the shaft 29 which is, as aforesaid, connected to the main driving shaft. The valve-actuating mechanism for each cylinder is thus a complete unit which may be removed in assembled condition with the head of that cylinder by merely removing the couplings 42 or 43 at the ends of the cross-shaft 30 of that cylinder. The timing of the valves may be adjusted by adjusting the position of a worm on the cross-shaft 45 which drives a gear on the shaft 44.

The operation of the engine which has been described may best be understood from the timing diagram, Fig. 11, and the diagrammatic views, Figs. 12 to 15. The timing diagram indicates by shaded areas the periods during which the various ports and valves are open. The right-hand side of the diagram represents the out-stroke of the piston, that is, the stroke in which the piston moves away from the cylinder head, while the left-hand side represents the in-stroke.

Figure 12:
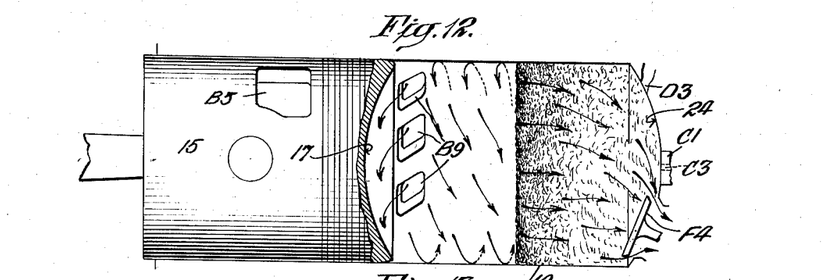
Figs. 12, 13, 14 and 15 are diagrammatic axial sections of a cylinder showing the positions and motions of the air, fuel and ignition charge at different points of the compression stroke of the piston.

Near the end of the out-stroke (at the point indicated by $a$ in the timing diagram, Fig. 11), the piston uncovers the by-pass ports B9 and, at the same time, the main exhaust valves F4 open. At this time (by an operation hereinafter explained), the crankcase has been filled with air under very considerable pressure, for example, fifteen pounds per square inch. As soon as the pressure within the cylinder has been relieved by the opening of the main exhaust valves, air rushes into the cylinder from the crank case through the by-pass. Owing to the spiral form of the external by-pass conduits B8 and the form of the by-pass ports B9, the air enters the cylinder as an advancing double helical spiral column. Owing to the curved surface 17 on the forward end of the piston, this column has a substantially flat top. The rapid swirling motion of the entering air tends to prevent this air from mixing substantially with the quiescent exhaust gas remaining in the cylinder, so that there is a sharp line of demarcation between the swirling fresh air and the exhaust gases displaced by the fresh air, as shown in Fig. 12.

Figure 13:
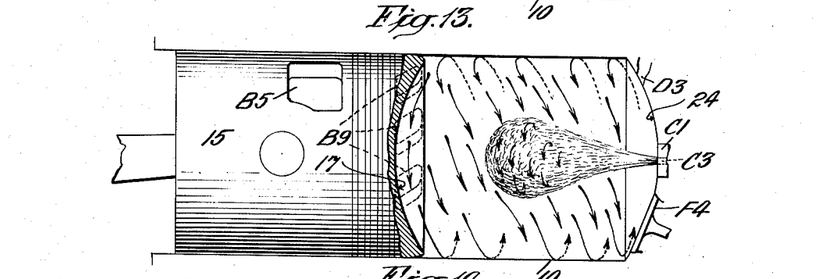
Figure 14:
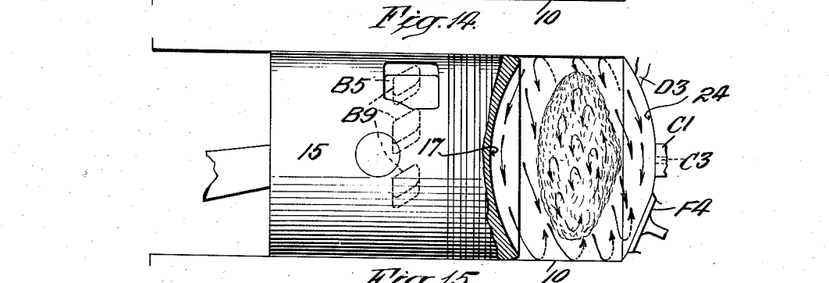

Shortly after the piston has begun its in-stroke (at the point indicated by $b$ in the timing diagram, Fig. 11), the piston covers and closes the by-pass ports B9, and the exhaust valves F4 close. The exhaust valves are so timed that they close just as the fresh swirling air has displaced the last of the exhaust gases which remain in the cylinder, leaving the cylinder filled with a rapidly swirling column of fresh air which is being compressed by the advance of the piston. The main fuel injector then operates to project finely divided fuel axially into the central part of the swirling body of air. The fuel mixes with the nearly stationary air at the center of the swirling mass and spreads outwardly, picking up the swirling motion so that a bulb-shaped body of a mixture of fuel and air is developed in the middle of the swirling mass of air, as shown in Fig. 13. The body of mixture extends further out in the swirling mass of air as the in-stroke continues, as shown in Fig. 14, until nearly at the end of the in-stroke the curved surfaces 24, 17 of the cylinder head 22 and the piston 15 enclose a swirling body of the mixture surrounded by a thin envelope of air. This envelope is of great value in preventing the combustion of the mixture from overheating either the cylinder head or the piston. It further insulates the charge from any hot spots, such as valves or piston heads, during the compression stroke and thereby prevents pre-ignition.

Figure 15:
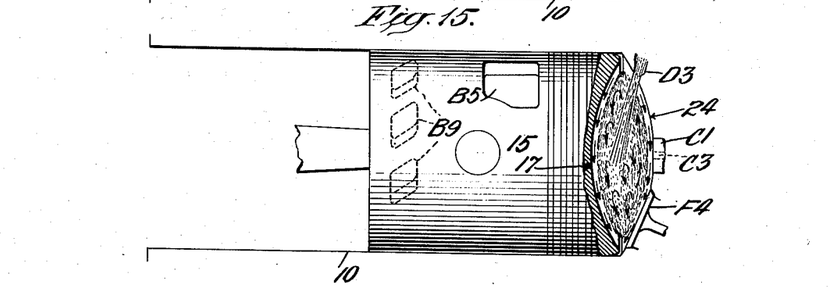

The firing of the mixture is effected just before the end of the in-stroke (at the point $d$ of the timing diagram) by operation of the spark plugs D7 in the primary combustion chamber D1 (which has been filled with an ignitable mixture in a manner hereinafter described). The burning gas ignited in the primary combustion chamber D1 is projected through the nozzle D2 diametrically into the swirling body of mixture in the cylinder, as shown in Fig. 15. The jet of flame arrests the swirling motion of the mixture, bringing the flame into thorough contact with the mixture and causing instant combustion of it. The burning mixture expands in the cylinder until the main exhaust valves F4 are again opened near the end of the out-stroke.

The charging of the primary combustion chamber D1 is effected as follows: Near the end of the out-stroke, at a time when the pressure in the crankcase exceeds that in the cylinder, the inlet valve D5 is opened for a short period to permit air from the crank case to enter the primary combustion chamber and scavenge it by forcing the burnt gas through the nozzle D2 into the cylinder. During the in-stroke, after the exhaust gas in the cylinder has been displaced and the main exhaust valves F4 have closed, the air compressed in the cylinder enters the nozzle D2 and compresses the air in the primary combustion chamber D1, but owing to the length of the nozzle D2, the heavy fuel from the cylinder does not reach the primary combustion chamber or the spark plugs. Also, during the in-stroke, the injector D6 is operated for a short interval to inject finely divided or gaseous fuel into the air in the primary combustion chamber, producing a mixture which may be ignited by the spark plugs D7.

The supplying of air to the crankcase and the compression of it therein is effected as follows: During the in-stroke, and the first part of the out-stroke, the inlet valve A3 is opened so that air under a low pressure (approximately three pounds per square inch) is forced into the crankcase and the parts of the cylinders behind the pistons by the blower A1. During the out-stroke and while the inlet valve A3 is closed, the air confined in the crankcase is compressed by the pistons. It is further compressed near the end of the out-stroke when the high-pressure exhaust valves E3 open for a short interval before the opening of the main exhaust valves, allowing burnt gas under high pressure to enter the outer ends of the ram conduits E1 and force the air in them ahead of it into the crankcase. The high-pressure exhaust valves are closed again just before the burnt gases reach the inner ends of the conduits E1 so that these gases do not enter the crankcase. The result of these operations is to place the air in the crankcase under very considerable pressure, for example, fifteen pounds per square inch, by the time the by-pass ports B9 open to admit it to the cylinders. During the time that the air inlet valve A3 is opened to admit air to the crankcase, the ram outlet valves E5 are also opened to permit the escape of the burnt gases which have been admitted to the ramming conduits E1 from the cylinder, so that the ramming conduits are filled with fresh air from the crankcase.

When the timing of the main fuel inlet is as shown in the timing diagram, Fig. 11, the engine is adapted to burn heavy fuel oil which is not subject to detonation in the cylinder. If a lighter oil such as kerosene is burned, the main fuel injector should be operated some 40° later than shown in the diagram in order to avoid detonation of the fuel in advance of the intended firing. The closing of the main exhaust F4 at the moment that the by-pass ports B9 are closed as indicated in the timing diagram is designed to permit the use with the engine of a muffler which retards the outflow of the burnt gases sufficiently to maintain super-atmospheric conditions in the cylinder during the scavenging so that the cylinder is super-charged at the beginning of the compression. If no muffler is used, the main exhaust valves F4 should be closed some 15° in advance of the closing of the by-pass ports B9 in order to provide for super-atmospheric pressure in super-charging at the beginning of the compression.

Advantages of the engine which has been described include the following:

The engine may be operated without inflammable fuel. The two-stage ignition makes it possible to use a heavy non-inflammable fuel oil as the main fuel. The priming fuel ignited in the primary combustion chamber amounts to only about ten per cent. of the total fuel used. This fuel must be light and of high-octane value, so that it may be ignited by a spark plug. Non-inflammable oils having these characteristics are available. They include a synthetic solvent known as "Safety Fuel" manufactured by the Standard Oil Company of New Jersey and now largely used as a cleaning fluid and commercial solvent. Because some of these fluids have a high solvent power for lubricating oil, they cannot be burnt in a cylinder of an internal combustion engine without seriously interfering with the lubrication of the piston. Such fuels may satisfactorily be used as the priming fuel of my engine, owing to the fact that the fuel is burned in a chamber separated from the cylinder and, therefore, cannot interfere with the lubrication of the piston. Ordinary gasoline may, of course, be used as the priming fuel, and, even in this case, a great increase in safety is introduced by the use of my engine since the priming fuel constitutes only a small proportion of the fuel to be carried.

The engine has a low weight-to-power ratio. Several features of the engine contribute to this. One is the method by which the heavy fuel is mixed with air and ignited without excessive compression which would require heavy castings. Still another is the fact that the engine may be operated at high speed. The speed of the engine is limited only by the rate at which the heat of combustion can be dissipated. The provision of an air envelope around the mixture at the moment of ignition prevents excessive heating of the cylinder heads and pistons, and this, coupled with the cooling of the pistons by the by-passed air, makes it possible to operate the engine at high speeds if the cylinders are provided with water jackets, as shown in Figs. 1 and 3.

The engine is of a flat shape which permits placing it within the wing of an airplane without interrupting the aerofoil surfaces of the wing. An important feature in making possible this result is the two-stage ignition with the provision of spark plugs with which the heavy fuel has not come into contact. The accurate timing provided by this spark plug ignition permits the multiple cylinder construction essential in making the engine compact and flat.

The engine may easily be started. This is another advantage of the two-stage ignition, as the combustion of the light fuel which is ignited in the primary combustion chamber provides sufficient power to turn the engine over and warm it up. After the engine has been run a short time on the primary fuel alone, the main fuel injector may be placed in operation with a certainty of the proper combustion of the heavy fuel.

A further advantage in this system of ignition is that the serious difficulties of handling the severe initial torque reactions when starting is eliminated. The method of starting is as follows: The engine is turned over by any of the conventional means and a small quantity of priming fuel only is admitted into primary combustion chamber D1. When this is fired by the spark plugs D7, the heat and pressure developed from this small zone are expanded into the compressed charge of air in the main cylinder head via nozzle D3, resulting in a gentle rise of pressure in the main cylinder which moves the piston on its outward stroke very much as is the case with a well-throttled steam engine, thereby eliminating the necessity of expensive and weighty structure in the engine mounting to resist the usual heavy Diesel reactions until the mechanism is turning over at high speeds.

Although all the features of the engine which have been described cooperate to give it these and other advantages, it is apparent that a number of these features may be used independently in other types of engines. Thus the introduction of a swirling body of gas into the cylinder for scavenging may be used in a two-cycle engine in which a combustible mixture instead of merely air is admitted to the crankcase. Also a number of features of the valve-operating mechanism which have been described are applicable to any engine having valves in its cylinder head.

What I claim is:

1. The method of scavenging an engine cylinder which comprises displacing quiescent burnt gas with an advancing, flat-topped, rapidly-swirling, cylindrical body of fresh gas so that a sharp plane of demarcation is maintained between the fresh gas and the burnt gas.

2. In an internal combustion engine, a piston, a cylinder having an exhaust opening near one end of the space enclosed by the cylinder and piston at the end of the out-stroke of the piston and having in its side wall near the other end of said space a tangential opening, and means for forcing fresh gas under pressure into the cylinder through said tangential opening to provide an advancing, flat-topped, swirling body of fresh gas to displace burnt gas through the exhaust opening.

3. In an internal combustion engine, a piston, a cylinder having an exhaust opening near one end of the space enclosed by the cylinder and piston at the end of the out-stroke of the piston and having in its side wall near the other end of said space an intake opening, a spiral conduit surrounding a part of the cylinder and communicating with said intake opening, and means for forcing gas under pressure through said spiral conduit into the cylinder to create a swirling body of gas in the cylinder.

4. In an internal combustion engine, a piston and cylinder which at the end of the out-stroke of the piston enclose a space bounded by a cylindrical wall and two end surfaces one of which is concave, and means for introducing into said space adjacent said concave end surface two diametrically opposite helically-moving streams of gas to provide a rotating, advancing, flat-ended column of gas in said space, which can displace quiescent gas from said spaces without material intermixture therewith.

5. The method of mixing finely divided fuel with air which comprises projecting the fuel axially into the central part of a rapidly rotating body of air.

6. In an internal combustion engine having a cylinder and piston, means for filling the cylinder with a rapidly rotating body of air before the compression stroke of the piston, and means for projecting finely divided fuel axially into the central part of said body of air during the compression stroke so that said fuel gradually picks up the whirling motion of the body of air and spreads out within the body of air.

7. In an internal combustion engine having a cylinder and piston, means for filling the cylinder with a rapidly rotating body of air before the compression stroke of the piston, means for projecting finely divided fuel axially into the central part of said body of air during the compression stroke so that said fuel gradually picks up the whirling motion of the body of air and spreads out within the body of air, and means for firing said fuel before it has spread to the surface of said body of air so that the burning fuel is surrounded by a skin of air.

8. The method of burning liquid fuel which comprises projecting the fuel in finely divided form axially into the central part of a whirling body of air so that the fuel spreads out within the whirling body of air, and then projecting a charge of burning gas diametrically into the whirling body to arrest its rotation and ignite the fuel.

9. In an internal combustion engine having a piston and cylinder, means for forming in the cylinder near the end of the compression stroke of the piston a whirling body of a mixture of fuel and air, and means for projecting a charge of burning gas diametrically into said whirling body to arrest its whirling motion and ignite it.

10. In an internal combustion engine, a cylinder having tangential air-intake openings, an axial fuel-inlet opening, and a diametrical fire-inlet opening.

11. In a two-cycle internal combustion engine having a cylinder, a crankcase and a piston, means providing a by-pass for admitting gas from the crankcase to the cylinder around the piston including ports in the cylinder wall which are located at opposite sides of the piston when the piston is at the end of its out-stroke and an external conduit connecting said ports and extending spirally about the cylinder.

12. In a two-cycle internal combustion engine having a cylinder, a crank case and a piston, means providing a by-pass for admitting gas from the crank case to the cylinder around the piston including ports in the cylinder wall which are located at opposite sides of the piston when the piston is at the end of its out-stroke and an external conduit of gradually decreasing cross section connecting said ports and extending spirally about the cylinder.

13. In a two-cycle internal combustion engine having a cylinder, a crank case and a piston, means providing a by-pass for admitting gas from the crank case to the cylinder around the piston including a pair of external conduits extending spirally about the cylinder, the cylinder having ports in its wall near the crank case communicating with the entrance ends of said conduits and having in its wall further from the crank case two diametrically opposite sets of a plurality of ports tangential to different circles co-axial with the cylinder and communicating with the outlet ends of said conduit.

14. In a two-cycle internal combustion engine having a cylinder, piston and crank case, means for introducing fresh gas into the crank case during the in-stroke of the piston, means for utilizing part of the high pressure burnt gas in the cylinder during the out-stroke of the piston to apply pressure to the gas in the crank case, and means providing a spiral by-pass for admitting the compressed fresh gas in the crank case into the cylinder at the end of the out-stroke of the piston to form a swirling body of fresh gas in the cylinder.

15. An internal combustion engine having a piston, a cylinder, a primary combustion chamber outside the cylinder, and means providing a passage connecting said chamber with the cylinder, means for introducing heavy fuel and air into the cylinder, means for introducing air under pressure into the primary combustion chamber near the end of the out-stroke of the piston when the pressure in the cylinder is low, means for introducing a light fuel into the primary combustion chamber during the in-stroke of the piston, and a spark plug in the primary combustion chamber, the passage between the primary combustion chamber and the cylinder being sufficiently long to prevent the heavy fuel in the cylinder from reaching the spark plug when the heavy fuel and air are compressed in the cylinder during the in-stroke of the piston.

16. A two-cycle internal combustion engine having a cylinder, piston and crank case, means providing a primary combustion chamber outside the cylinder and in communication therewith, means for introducing air from the crank case into the cylinder, means for introducing heavy fuel into the cylinder, a conduit connecting the crank case with the primary combustion chamber, a valve controlling said conduit, means for opening said valve on each revolution of the engine to admit air from the crank case to the primary combustion chamber, means for supplying light fuel to the primary combustion chamber, and a spark plug in the primary combustion chamber for igniting said fuel.

17. A multiple-cylinder heavy-fuel-burning internal combustion engine having a primary combustion chamber communicating with each cylinder, means for supplying a heavy fuel to each cylinder, and means for supplying a light fuel and air to each primary combustion chamber, and spark plugs in the primary combustion chambers to cause instantaneous ignition of the heavy fuel in the cylinder without coming in contact therewith.

18. In a two-cycle internal combustion engine having a cylinder and crank case and external by-pass conduits connecting outlet and inlet ports in the cylinder wall, a piston in the cylinder having a skirt extending toward the crank case and containing lateral openings adapted to register with the cylinder outlet openings when the piston is at the lower end of its stroke, a diametrical partition within the skirt of the piston, a transverse partition located at the rear end of said diametrical partition and containing apertures at opposite sides of said diametrical partition, and cooling fins in the passages between said apertures and the ports in the skirt of the piston.

19. A two-cycle internal combustion engine having a plurality of pairs of opposed cylinders and a crank case connecting each pair of cylinders, a main shaft extending through the crank cases, a blower on the main shaft, conduits connecting the blower with each crank case, air-inlet valves for each crank case controlling said conduits, each cylinder having a head containing a main exhaust port and a high-pressure exhaust port, valves controlling said exhaust ports, a conduit connecting the high-pressure exhaust port of each cylinder with the crank case connected to that cylinder and containing an outlet opening spaced from the crank case, a valve controlling said outlet opening, means providing a primary combustion chamber outside of each cylinder and a passage connecting said chamber to the cylinder and extending diametrically of said cylinder, a conduit connecting the primary combustion chamber of each cylinder with the crank case connected to that cylinder, a primary air-inlet valve controlling said conduit, a spark plug in each primary combustion chamber, a piston in each cylinder having a concave front surface, cooling fins on each piston, by-pass means for each cylinder providing a spiral passage for directing air from the crank case over the cooling fins of the piston and spirally into the cylinder adjacent to the concave front end of the piston when the piston is at the outer end of its stroke, a heavy fuel injector mounted on the head of each cylinder and directed axially into the cylinder, a light-fuel injector directed into each primary combustion chamber, a casing on the head of each cylinder, unitary means for actuating the high-pressure exhaust valve, the main exhaust valve and the primary air-inlet valve located in each casing, and means for timing said valves, the other valves of the engine and the spark plugs so that on each revolution of the engine shaft air is introduced into the crank case, compressed in the crank case by exhaust gases escaping through the primary exhaust ports, admitted to the cylinders through the by-passes in a swirling body which displaces the exhaust gases through the main exhaust ports, and air is admitted to the primary combustion chambers from the crank cases, while heavy fuel is injected into each cylinder during the in-stroke of its piston and is ignited by burning light fuel ignited in the primary combustion chambers by the spark plugs.

20. The method of operating an internal combustion engine, which comprises providing an insulating envelope of gas within the cylinder of the engine, introducing a mixture of heavy fuel and air into said insulating envelope, igniting a mixture of light fuel and air outside the insulating envelope, and introducing the burning light fuel into the insulating envelope to ignite the heavy fuel therein.

WILLIAM HARPER, Jr.